United States Patent [19]

Murabayashi et al.

[11] Patent Number: 5,311,373
[45] Date of Patent: May 10, 1994

[54] VIDEO TAEPE RECORDER

[75] Inventors: Noboru Murabayashi; Akihiro Tsubaki, both of Tokyo, Japan

[73] Assignee: Sony Corporation, Tokyo, Japan

[21] Appl. No.: 129,571

[22] Filed: Sep. 29, 1993

Related U.S. Application Data

[63] Continuation of Ser. No. 710,133, Jun. 4, 1991, abandoned.

[30] Foreign Application Priority Data

Jun. 12, 1990 [JP] Japan ............... 2-153224

[51] Int. Cl.$^5$ ............... G11B 5/02
[52] U.S. Cl. ............... 360/27; 360/25
[58] Field of Search ............... 360/27, 28, 30, 25; 358/335, 13

[56] References Cited

U.S. PATENT DOCUMENTS

| | | | |
|---|---|---|---|
| 4,786,986 | 11/1988 | Yamanushi et al. | 360/27 |
| 4,811,122 | 3/1989 | Lido et al. | 360/25 |
| 4,989,102 | 1/1991 | Murabayashi et al. | 360/27 |
| 5,040,082 | 8/1991 | Moro et al. | 360/27 |
| 5,113,265 | 5/1992 | Kobayashi et al. | 360/27 |
| 5,121,266 | 6/1992 | Ito et al. | 360/27 |
| 5,164,862 | 11/1992 | Kawamata | 360/27 |

Primary Examiner—Robert J. Pascal
Assistant Examiner—Tan Dinh
Attorney, Agent, or Firm—Lewis H. Eslinger; Jay H. Maioli

[57] ABSTRACT

An apparatus is provided for selectively recording a digital information signal on a first magnetic tape cassette having a tape with a first characteristic or a second magnetic tape cassette having a tape with a second characteristic. The digital information signal selectively has a recording mode of a first standard or a recording mode of a second standard. The apparatus comprises a first sensor for detecting the kind of the magnetic tape cassette, a second sensor for detecting the kind of the recording mode, and a controller for controlling value of recording current for the digital information signal in response to the outputs of the first sensor and the second sensor.

8 Claims, 11 Drawing Sheets

FIG.1

| Mode \ Level | Sync. Chip Level | White Peak Level |
|---|---|---|
| Standard Mode | 4.2 MHz | 5.4 MHz |
| High Band Mode | 5.7 MHz | 7.7 MHz |

FIG.2

| Mode | Sampling Frequency | Quantization Bit Number | Recording Bit Number | Modulation System | Track Length |
|---|---|---|---|---|---|
| NRML Mode | 31.5 kHz | 10 Bits | 8 Bits Nonlinear | Biphase Mark | 36° |
| L Mode | 48 kHz | 16 Bits | 16 Bits Liner | 8/10 Conversion | 41° |
| | 44.1 kHz | | | | |
| | 32 kHz | | | | |
| N Mode | 48 kHz | 16 Bits | 12 Bits Nonlinear | 8/10 Conversion | 41° |
| | 44.1 kHz | | | | |
| | 32 kHz | | | | |

| Mode | Nyquist Frequency | Recording Wavelength |
|---|---|---|
| NRML Mode | 5.8 MHz | 0.65 μm |
| L Mode | 8.3 MHz | 0.45 μm |
| N Mode | 6.6 MHz | 0.57 μm |

| | Tape | Mode |
|---|---|---|
| ① | HGMP | NRML |
| ② | HGMP | L |
| ③ | HGMP | N |
| ④ | ME | NRML |
| ⑤ | ME | L |
| ⑥ | ME | N |
| ⑦ | MP | NRML |

FIG. 8A
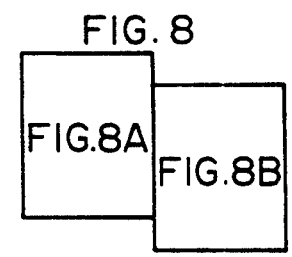
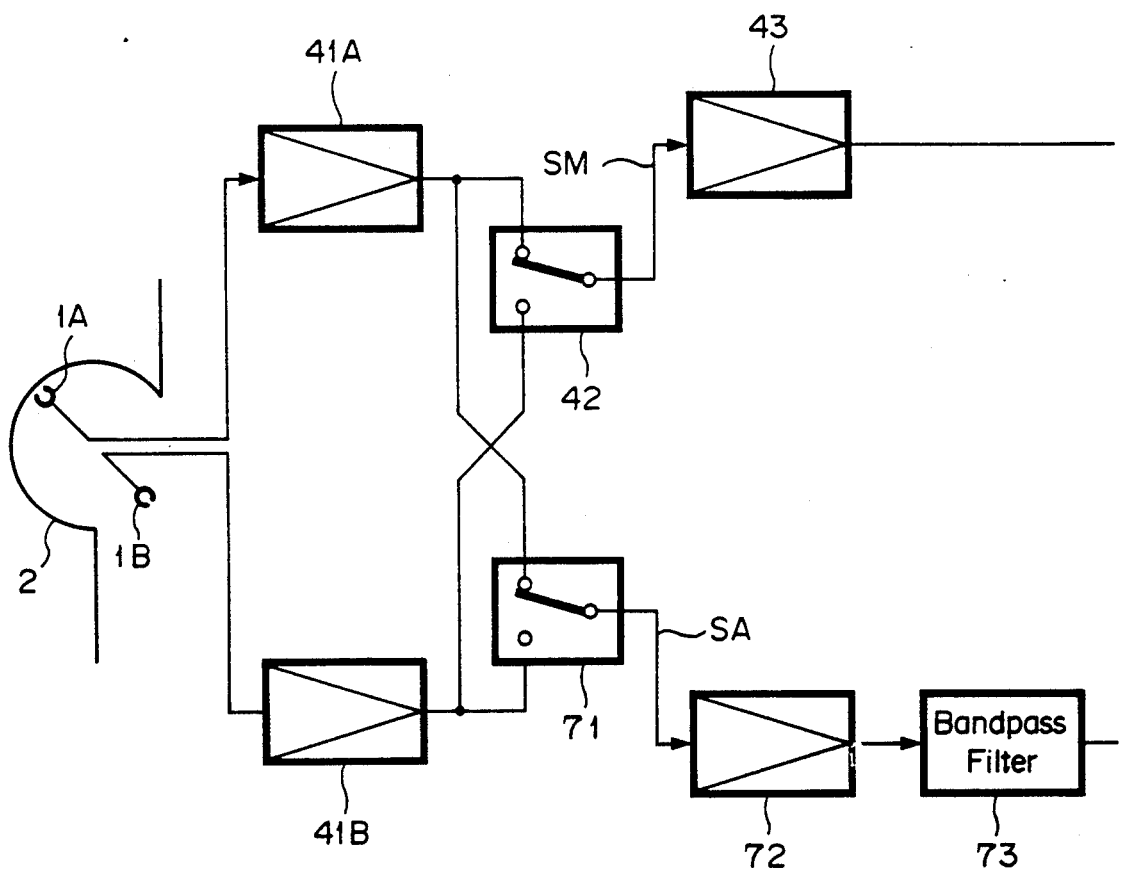

FIG. 9
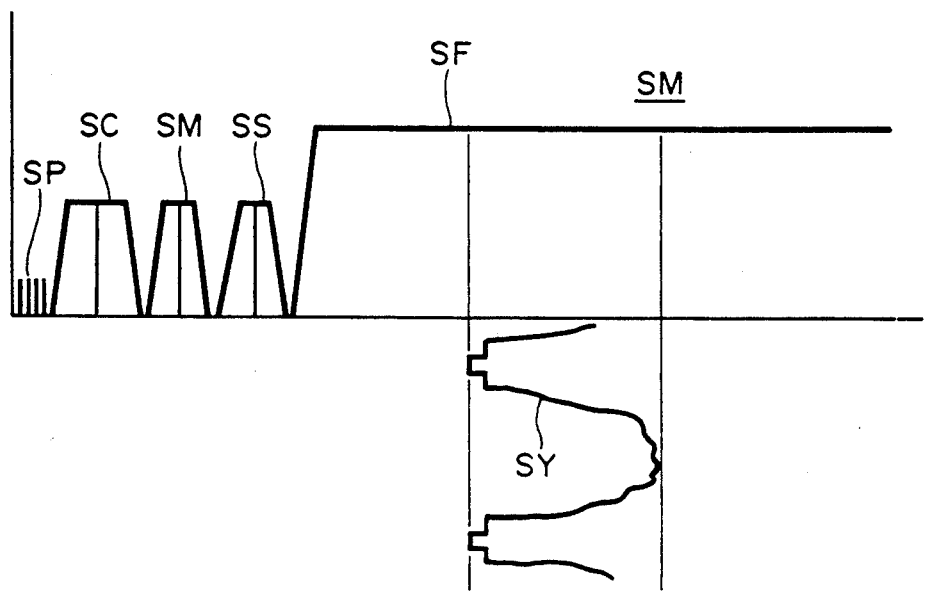
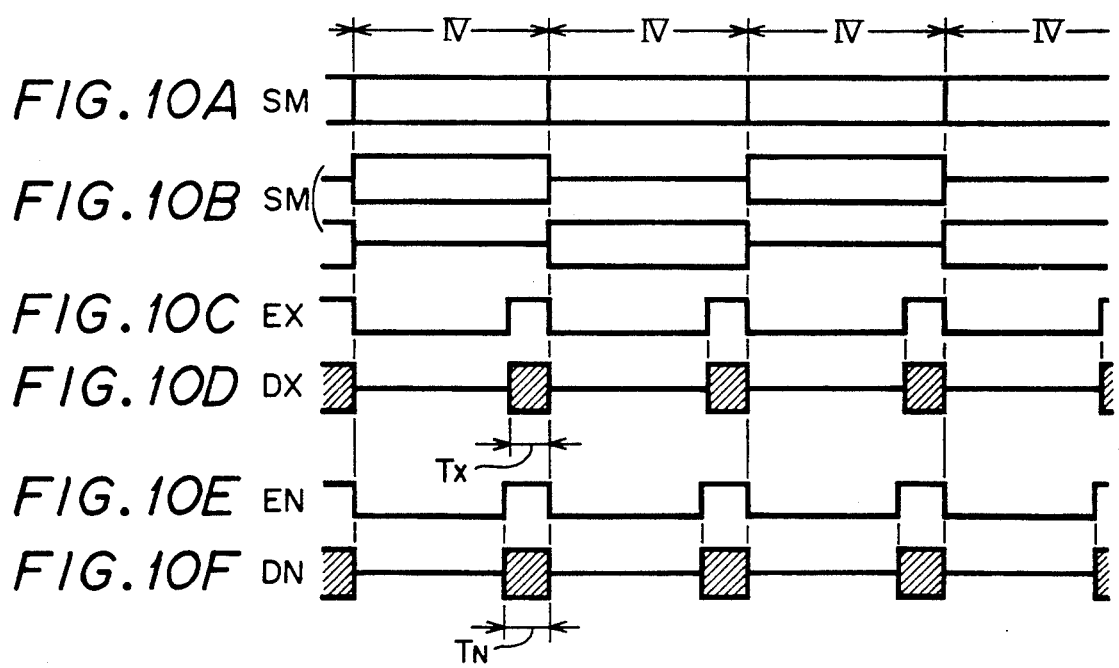

| Tape | Recording Time Mode | Image Recording Mode | Audio Recording Mode |
|------|---------------------|----------------------|----------------------|
| MP   | SP                  | Standard Mode        | NRML Mode            |
|      | LP                  |                      |                      |
| HGMP | SP                  | High Band Mode       | L Mode               |
|      | LP                  |                      |                      |
| ME   | SP                  | High Band Mode       | L Mode               |
|      | LP                  |                      |                      |

| Mode<br>Tape | Standard • NRML | | High Band • L | | High Band • N | |
|---|---|---|---|---|---|---|
| | SP | LP | SP | LP | SP | LP |
| MP | 7B | 7B | Turned Off | Turned Off | Turned Off | Turned Off |
| HGMP | 7B | 7B | 7R | 7R | 7Y | 7Y |
| ME | 7B | 7B | 7R | 7R | 7Y | 7Y |

VIDEO TAPE RECORDER

This is a continuation of application Ser. No. 07/710,133, filed Jun. 4, 1991 and now abandoned.

BACKGROUND OF THE INVENTION

1. Field of the Invention

The present invention generally relates to video tape recorders and, more particularly, is directed to a so-called 8-mm video tape recorder.

2. Description of the Prior Art

According to the standards determined when the so-called 8-mm video tape recorder was originated, upon recording, a luminance signal is converted into an FM (frequency-modulated) luminance signal having a sync. (synchronizing) chip level of 4.2 MHz and a white peak level of 5.4 MHz as shown on the second row of FIG. 1. This FM luminance signal is recorded on a magnetic tape at every field period as a slant video track (this mode will hereinafter be referred to as "standard mode" and the above values are in accordance with the NTSC system).

When an audio signal is converted into a pulse-code modulated (PCM) audio signal and recorded on the magnetic tape, it is recorded according to the standards shown on the second row in FIG. 2. More specifically, the audio signal is quantized into a digital signal having a sampling frequency of 31.5 kHz (this sampling frequency is substantially twice the horizontal frequency) and one sample of 10 bits. After one sample of this digital signal is nonlinearly data-compressed in the form of 10 bits to 8 bits, this data-compressed digital signal is converted into a biphase mark signal. The biphase mark signal is recorded in the video track at its front overscan interval over an angular extent of 36 degrees (this mode will hereinafter be referred to as "NRML mode").

In the 8-mm video tape recorder, a quality of image is improved in addition to the standards of the standard mode. That is, upon recording, the luminance signal is converted into an FM signal having a sync. chip level of 5.7 MHz and a white peak level of 7.7 MHz as shown on the third row of FIG. 1 and, this FM luminance signal is recorded on the magnetic tape at every field period as a slant video track (this mode will hereinafter be referred to as "High band mode").

It is proposed to improve the quality of sound of a PCM audio signal in accordance with the improvement of the quality of image. When the quality of sound is improved, it is proposed to employ a linear mode and a non-linear mode (they will hereinafter be referred to as "L mode" and "N mode").

That is, in the L mode, the audio signal is quantized into a digital signal in which a sampling frequency is any of 48 kHz, 44.1 kHz and 32 kHz and one sample is formed of 16 bits. This digital signal is converted in an eight-to-ten (8-10) conversion manner and, the converted digital signal is recorded in the video track at its front over-scan interval over an angular extent of 41 degrees.

In the N mode, as shown on the fourth row of FIG. 2, one sample of the quantized digital signal is non-linearly data-compressed in the form of 16 bits to 12 bits and then recorded similarly to the L mode.

Since the recorded signal involves an error correction code, an identification (ID) code or the like in actual practice, the Nyquist frequency (maximum recording frequency) and the minimum wavelength of the recorded signal on the magnetic tape are presented as shown in FIG. 3 (values on FIG. 3 are roughly estimated).

Therefore, according to the new standards of the PCM audio signal, the audio signal can be recorded and reproduced with characteristics equal to or higher than those of a CD (compact disc) and R-DAT (rotary-type digital audio tape recorder).

As described above, in the 8-mm video tape recorder, the standards of the standard mode and the NRML mode are determined and then the standard of the high band mode is added in accordance with the development of technology. Furthermore, the standards of L mode and the N mode are additionally provided.

OBJECTS AND SUMMARY OF THE INVENTION

Accordingly, it is an object of the present invention to provide a video tape recorder in which the recording can be made with optimum recording characteristics in association with a variety of combinations of audio modes and tape cassettes.

More specifically, it is an object of the present invention to provide a video tape recorder in which error rate of a reproduced PCM audio signal can be minimized upon reproduction.

It is another object of the present invention to provide a video tape recorder in which the user need not take care of the kind of tape cassette in use.

According to an aspect of the present invention, an apparatus for selectively recording a digital information signal on a first magnetic tape cassette having a tape with a first characteristic or a second magnetic tape cassette having a tape with a second characteristic, the digital information signal selectively having a recording mode of a first standard or a recording mode of a second standard comprises of a first sensor for detecting the kind of the magnetic tape cassette, a second sensor for detecting the kind of the recording mode, and a controller for controlling value of recording current for the digital information signal in response to the outputs of the first sensor and the second sensor.

The above and other objects, features, and advantages of the present invention will become apparent in the following detailed description of illustrative embodiments thereof to be read in conjunction with the accompanying drawings, in which like reference numerals are used to identify the same or similar parts in the several views.

BRIEF DESCRIPTION OF THE DRAWINGS

FIG. 1 is a table used to explain the standard of an 8-mm video tape recorder;

FIG. 2 is a table used to explain recording characteristics of the 8 mm video tape recorder;

FIG. 9 is a frequency spectrum diagram used to explain the present invention;

FIGS. 10A through 10F are timing charts used to explain operation of the present invention;

DETAILED DESCRIPTION OF THE PREFERRED EMBODIMENTS

Before describing the preferred embodiments of the invention, let us initially describe the fundamental principle of the present invention.

Since the 8-mm video tape recorders have been developed so far, standard mode and NRML mode tape cassettes are prepared initially. This kind of tape cassette utilizes a standard type coating tape (this tape cassette will hereinafter be referred to as "MP (metal particle) tape cassette). However, the MP tape cannot cope with the high band mode and therefore a tape cassette which can cope with the high band mode is prepared.

Tape cassettes which can cope with the high band mode are a tape cassette utilizing a high grade metal particle tape (this tape will hereinafter be referred to as an HGMP tape) and a tape cassette utilizing a metal evaporated tape (this tape will hereinafter be referred to as an ME tape).

The HGMP tape and ME tape can cope not only with the high band mode but also with the L mode and the N mode.

Figures 5, 6:
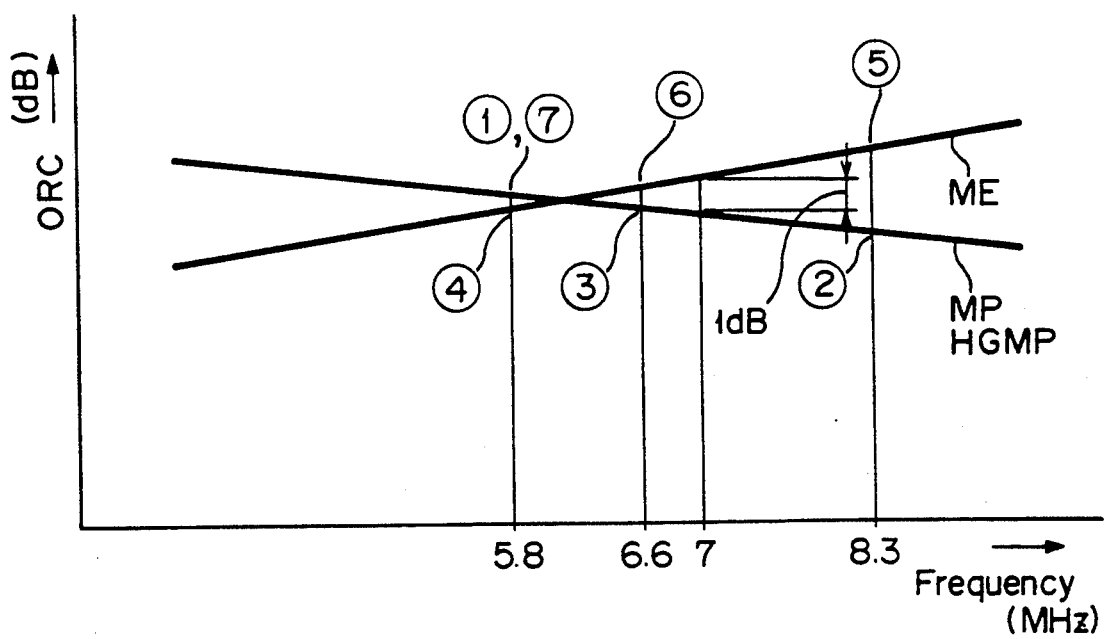
FIG. 5 is a table used to explain the combinations of the audio modes and the tape cassettes.
FIG. 6 is a graph of frequency characteristics used to explain the present invention.

Accordingly, in use, the audio modes and the tape cassettes can be combined as shown by ①  to ⑦ in FIG. 5.

Figures 3, 4:
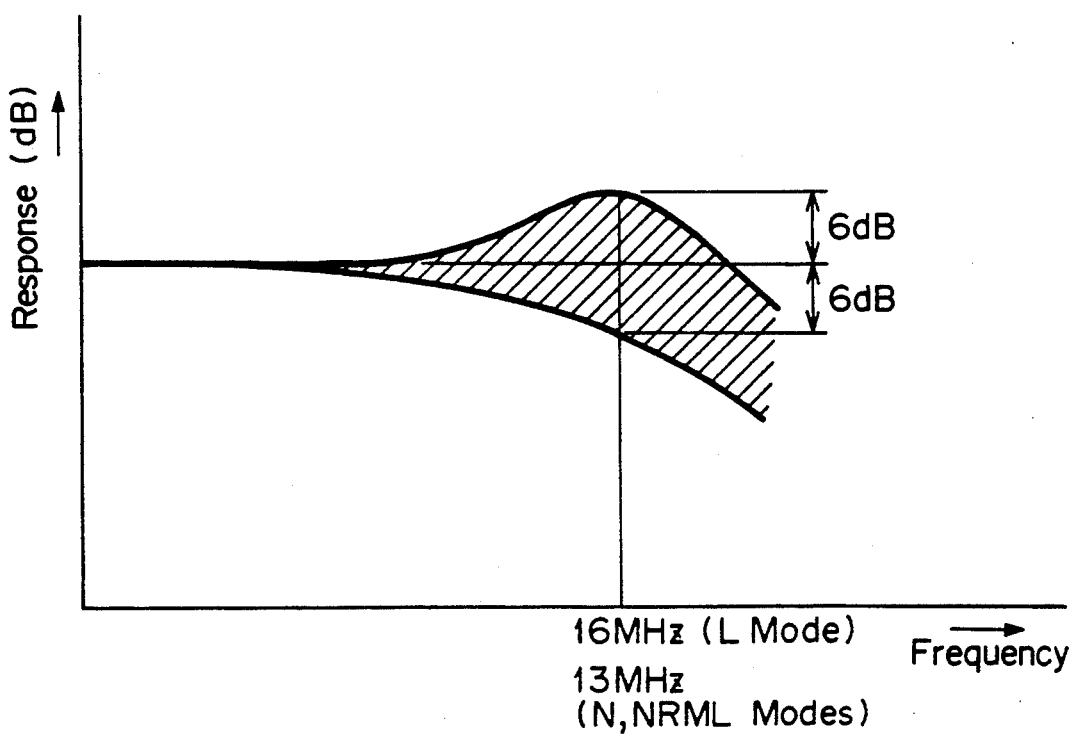
FIG. 3 is a table used to explain recording characteristics according to respective modes of the 8-mm video tape recorder.
FIG. 4 is a graph of frequency characteristics used to explain the present invention.

Incidentally, according to the experimental results of the recording frequency characteristics necessary for NRML mode, L mode and N mode, it was understood that these recording characteristics might fall within a hatched area in FIG. 4. That is, it was understood that the error rate of the reproduced PCM audio signal was sufficiently small if the frequency response fell within ±6 dB when the frequency of any PCM mode was substantially twice the Nyquist frequency.

Further, FIG. 6 shows experimental results of frequency characteristics of optimum recording current (ORC) of MP tape, HGMP tape and ME tape. As shown in FIG. 6, the characteristics of the MP tape and the HGMP tape are substantially equal to each other and their ORCs are lowered in inverse proportion to the increase of the recording frequencies. However, if the recording frequency is increased, the ORC of the ME tape is increased and both characteristics cross each other near 6 MHz.

In view of the above-mentioned frequency characteristics, the present invention is intended to make the optimum recording.

That is, according to the present invention, the optimum values of the recording current in the combinations ①  to ⑦ of FIG. 5 are set to points ①  to ⑦ on the characteristics of FIG. 6.

A first embodiment of the video tape recorder according to the present invention will hereinafter be described with reference to the drawings.

Figure 7A:
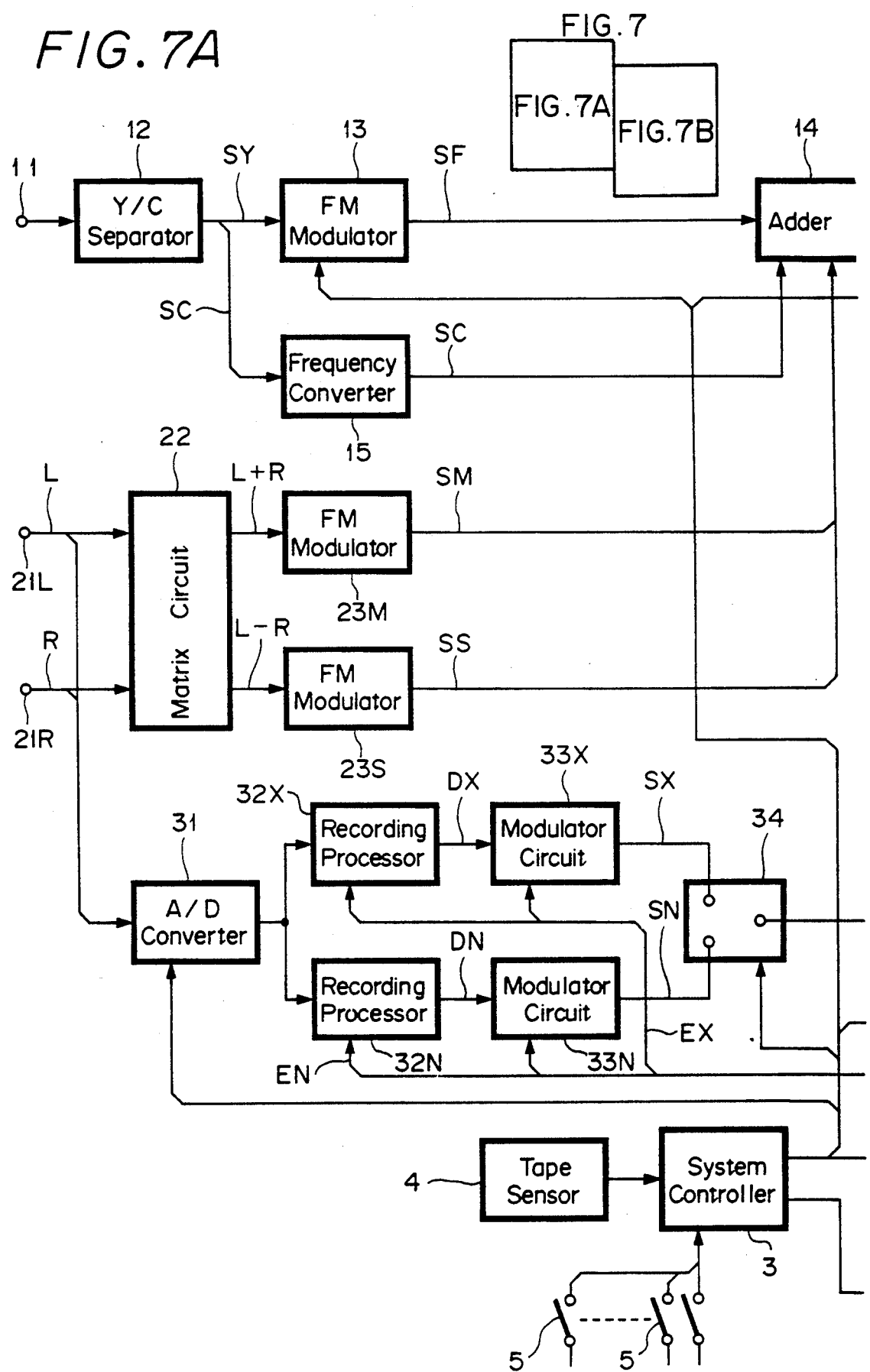
FIG. 7 (formed of FIGS. 7A and 7B) is a block diagram showing a recording system of the video tape recorder according to the first embodiment of the present invention.
Figure 7B:
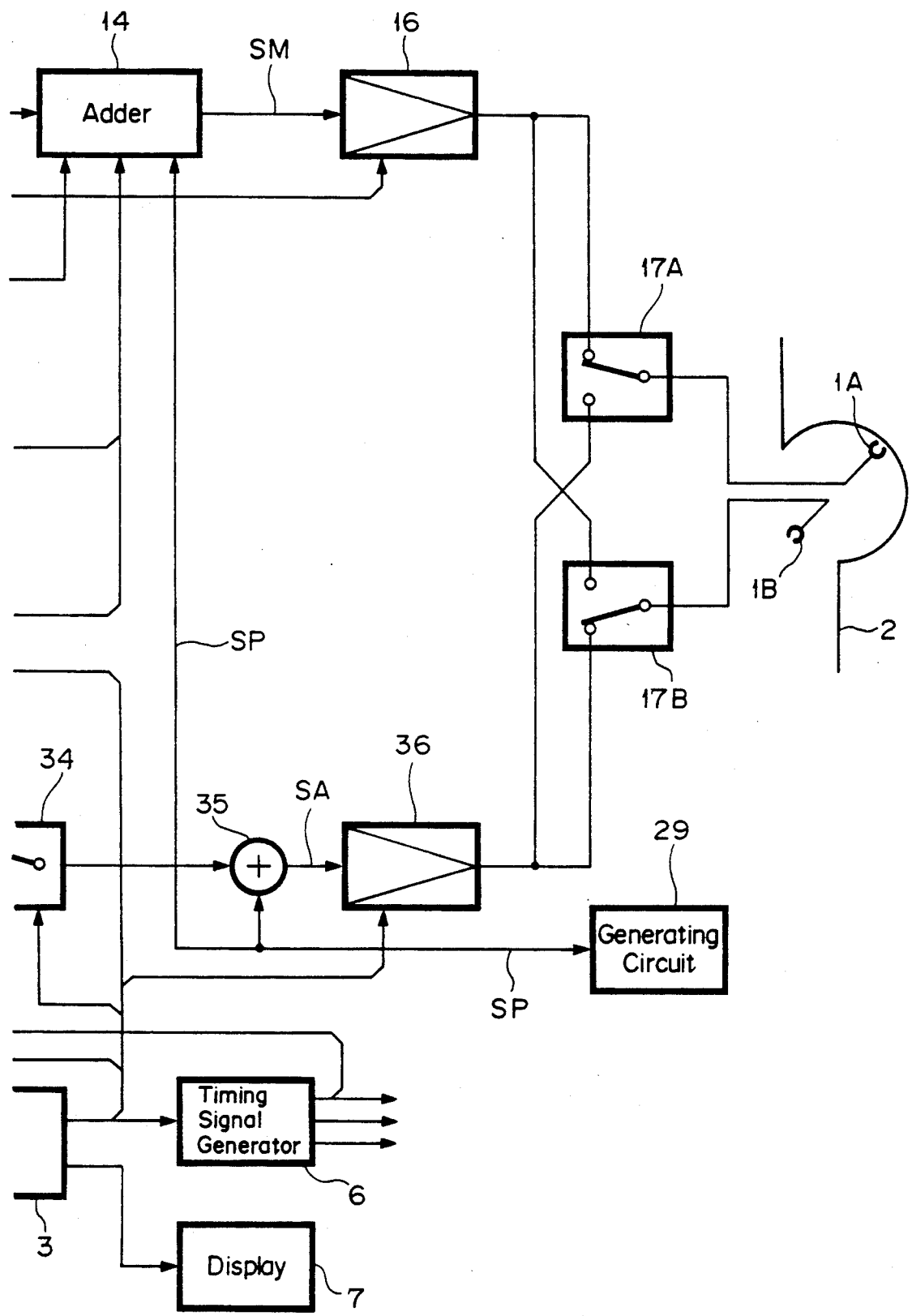
Figure 8B:
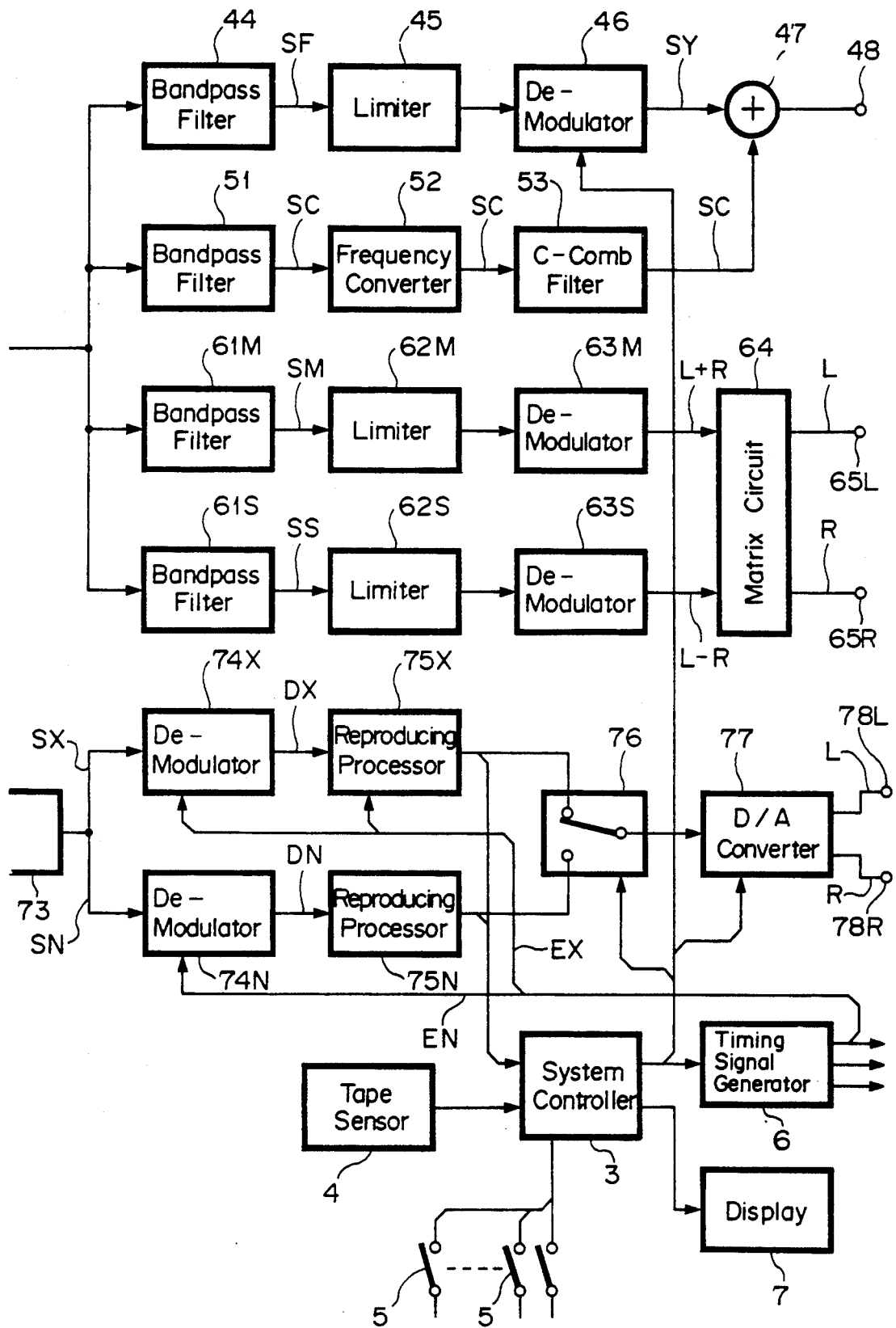
FIG. 8 (formed of FIGS. 8A and 8B) is a block diagram showing a reproducing system of the video tape recorder according to the present invention.

FIG. 7 is a block diagram showing a recording system of the video tape recorder of the present invention and FIG. 8 is a block diagram showing a reproducing system thereof. In this case, FIGS. 7 and 8 are both formed of FIGS. 7A, 7B and FIGS. 8A, 8B drawn on two sheets of drawings so as to permit the use of a suitably large scale.

As illustrated, a system controller 3 is provided to supply control signals to the following circuits to control operation of the entirety of the video tape recorder. This system controller 3 is formed of a microcomputer.

A tape sensor 4 and operation keys 5 are connected to the system controller 3. The tape sensor 4 is adapted to detect by an ID hole of a tape cassette (not shown) the type of the tape cassette, such as MP tape cassette, HGMP tape cassette and ME tape cassette and, a detected output from the tape sensor 4 is supplied to the system controller 3. The operation keys 5 are used by the user to designate various modes of this video tape recorder, that is, to select any of NRML mode, L mode and N mode as the PCM audio signal recording mode.

In the following processing, if the tape sensor 4 indicates by the detected output thereof that the tape cassette is the MP tape cassette regardless of the high band mode, the L mode and the N mode designated by the operation key 5, then the mode designated by the operation key 5 is neglected and the video tape recorder is placed in the standard mode or the NRML mode.

A timing signal generator circuit 6 is adapted to generate various kinds of clocks and timing signals synchronized with the video signal which are then supplied to respective circuits which will be described later. A display 7 is formed of a light emitting diode (LED) to display on a display screen thereof the operation mode of the video tape recorder, the kind of tape cassette and the kind of the mode such as the standard time mode and the long time mode.

Upon recording, the NTSC color composite video signal is supplied through a terminal 11 to a Y/C (luminance/chrominance) separating circuit 12, in which it is separated into a luminance signal SY and a carrier chrominance signal SC. The luminance signal SY is supplied to an FM modulator circuit 13, in which it is converted into an FM luminance signal SF as shown in FIG. 9.

A control signal based on the outputs of the tape sensor 4 and the operation key 5 is supplied from the system controller 3 to the FM modulator 13 so that the modulation characteristic of the FM modulator 13 is switched. Thus, the luminance signal SY is converted into the FM luminance signal SF having a sync. chip level of 4.2 MHz and a white peak level of 5.4 MHz in the case of the standard mode and a sync. chip level of 5.7 MHz and a white peak level of 7.7 MHz in the case of the high band mode.

This FM luminance signal SF is supplied to an adding circuit 14.

The carrier chrominance signal SC from the Y/C separating circuit 12 is supplied to a frequency converter 15 where it is processed in phase so as to remove a crosstalk component between adjacent tracks and also in which it is frequency-converted into the low band carrier chrominance signal SC as shown in FIG. 9. This signal SC is supplied to the adding circuit 15.

Left-channel and right channel audio signals L and R are supplied through terminals 21L and 21R to a matrix circuit 22 which produces a sum signal (L+R) and a difference signal (L−R) of the signals L and R. The signals (L+R) and (L−R) are supplied to FM modulating circuits 23M and 23S, in which they are converted into FM signals SM and SS which are allocated between the signals SC and SF as shown in FIG. 9. The signals SM and SS are supplied to the adding circuit 14.

A generating circuit 29 generates a pilot signal SP whose frequency is changed at every field cycle and this pilot signal SP is supplied to the adding circuit 14.

Accordingly, the adding circuit 14 successively derives a frequency-multiplexed signal SM as shown in FIG. 10A and the frequency spectrum of this frequency-multiplexed signal SM is represented in FIG. 9.

The signal SM is supplied through a recording amplifier 16 to switching circuits 17A, 17B and these switching circuits 17A, 17B are changed in position at every field period in response to a control signal from the generating circuit 6, thereby the signal SM being alternately produced at every field period as shown in FIG. 10B.

The signals SM, SM are supplied to rotary magnetic heads 1A, 1B. The rotary magnetic heads 1A, 1B are rotated at a frame frequency in synchronism with the luminance signal SY by a servo circuit (not shown). Also, a magnetic tape 2 is obliquely wrapped around their rotary circumferential surfaces over an angular extent of more than 221 degrees and transported thereby at a constant speed.

Figure 11A:
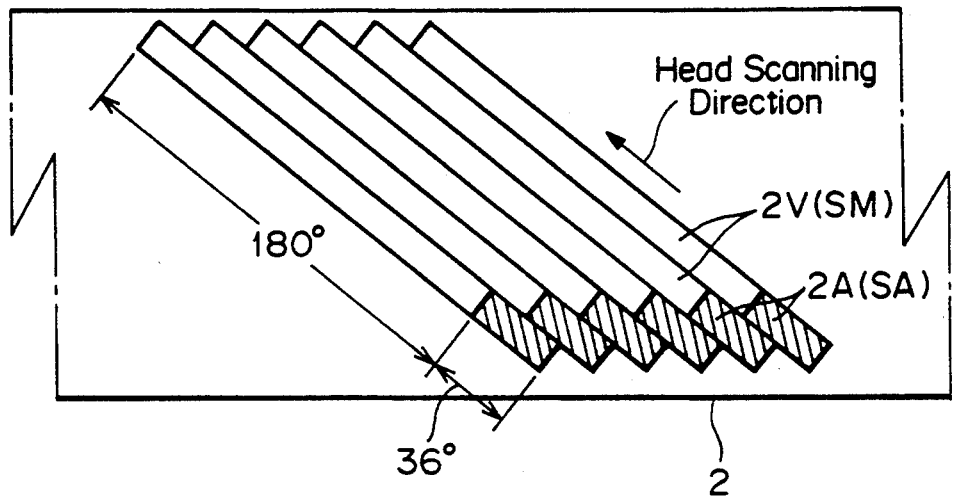
FIGS. 11A and 11B are diagrams of track pattern used to explain the operation of the present invention, respectively.

Therefore, the signals SM, SM supplied to the heads 1A, 1B are recorded on the magnetic tape 2 at every field as a slant magnetic track 2V as shown in FIG. 11A.

The audio signals L and R applied to the terminals 21L, 21R are supplied to an analog-to-digital (A/D) converter 31, thereby converted into digital audio data. A control signal based on the outputs of the sensor 4 and the operation key 5 is supplied from the system controller 3 to the A/D converter 31, whereby a sampling frequency and a quantization bit number of the A/D converter 31 are switched in response to the PCM audio signal recording modes (NRML mode, L mode and N mode) as shown in FIG. 2.

If the PCM audio signal recording mode is the NRML mode, then the following processing is performed.

That is, the digital audio data from the A/D converter 31 is supplied to a recording processor circuit 32X, in which it is added with an error correction code and timebase-compressed at every field period to provide digital data DX.

In this case, the system controller 3 controls the generating circuit 6 so as to supply the recording processor circuit 32X with an enable signal EX shown in FIG. 10C, that is, the enable signal EX which goes high "1" level at a 1/5 (36 degrees/180 degrees) field period Tx of the end of each field period with reference to a vertical synchronizing pulse. Thus, as shown in FIG. 10D, the digital data DX is located within the period TX of each field period.

The digital data DX and the enable signal EX are supplied to a modulating circuit 33X, in which the digital data DX is converted into a biphase mark signal SX of the period Tx. This biphase mark signal SX is supplied to a switching circuit 34 and the switching circuit 34 is connected to the illustrated state by the system controller 3, thereby the signal SX being produced from the switching circuit 34.

The thus derived signal SX is supplied to an adding circuit 35 and a pilot signal SP from the generating circuit 29 is supplied to the adding circuit 35 whose added output SA is alternately supplied through a recording amplifier 36 and the switching circuits 17A, 17B to the magnetic heads 1A, 1B at every field.

Therefore, as shown in FIG. 11A, the signal SA is recorded on the magnetic tape 2 in its over-scan portion of the starting side of the track 2V at every field period as a slant track 2A having an angular extent of 36 degrees.

In this case, however, the gain of the recording amplifier 36 is controlled by the system controller 3 so that, when the tape cassette is the MP tape cassette or the HGMP tape cassette, the level of the recorded signal SA is set to a point ①(=⑦) of FIG. 6 and that, when the tape cassette is the ME tape cassette, the level of the signal SA is set to a point 4 of FIG. 6. In that event, the gain of the recording amplifier 16 also is controlled by the system controller 3 so that the level of the recorded signal SM is controlled similarly.

As described above, the recording is performed when the PCM audio signal recording mode is the L mode.

If the PCM audio signal recording mode is the L mode or N mode, then the following processing is performed.

The digital audio data from the A/D converter 31 is supplied to a recording processor circuit 33N, in which it is compressed in data from 16 bits to 12 bits (in the N mode only), added with an error-correction code and is timebase-compressed to thereby provide digital data DN.

In this case, the system controller 3 controls the generating circuit 6 so as to supply the recording processor circuit 32N with an enable signal EN shown in FIG. 4E, that is, the enable signal EN which goes high "1" level at 1/4.4 (=41 degrees/180 degrees) field period of the end of each field period with reference to the vertical synchronizing pulse. Thus, the data DN is located within the period TN of each field period.

The digital data DN and the enable signal EN are supplied to a modulating circuit 33N, in which it is modulated in an eight-to-ten (8/10) modulation manner to provide a signal SN. The signal SN is supplied to the switching circuit 34 and the switching circuit 34 is connected in the opposite side, whereby the signal SN is produced from the switching circuit 34. Then, this signal SN is supplied to the adding circuit 35 and the added output SA is supplied through the recording amplifier 36 and the switching circuits 17A, 17B to the magnetic heads 17A, 17B.

Figure 11B:
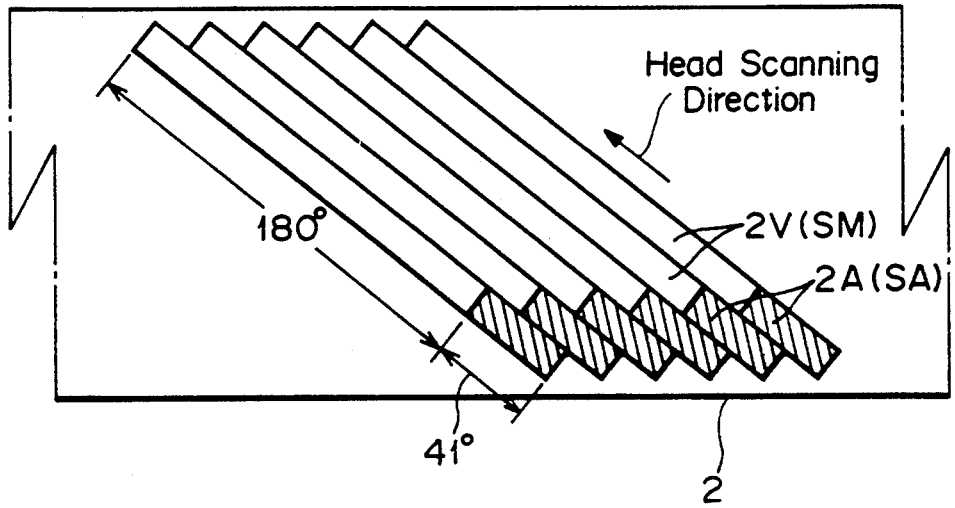

Therefore, as shown in FIG. 11B, the signal SA is recorded on the magnetic tape 2 in its over-scan portion of the starting side of the track 2V at every field period as a slant track 2A having an angular extent of 41 degrees.

In this case, however, the gain of the recording amplifier 36 is controlled by the system controller 3 so that, when the PCM audio signal recording mode is the L mode and when the cassette tape is the HGMP tape cassette, the level of the recorded signal SA is set to a point ② of FIG. 6, when the PCM audio signal recording mode is the L mode and when the tape cassette is the ME tape cassette, the level of the recorded signal SA is set to a point ⑤ of FIG. 6, when the PCM audio signal recording mode is the N mode and when the tape cassette is the HGMP tape cassette, the level of the recorded signal SA is set to a point ③ of FIG. 6 and that, when the PCM audio signal recording mode is the N mode and when the tape cassette is the ME tape cassette, the level of the recorded signal SA is set to a point ⑥ of FIG. 6.

In that event, the gain of the recording amplifier 16 also is controlled so that the level of the recorded signal SM is controlled similarly. As described above, the recording is made when the PCM audio signal recording mode is the L mode or the N mode.

In the above recording mode, the kind of tape cassettes, the PCM audio signal recording mode and so on are displayed by the display 7 under the control of the system controller 3.

Upon reproduction, the signals SM, SA are alternately reproduced from the magnetic tape 2 by the heads 1A, 1B at every field and these signals SM, SA are supplied through head amplifiers 41A, 41B to a switching circuit 42. Also, the control signal is supplied from the generating circuit 3 to the switching circuit 42 so that the switching circuit 42 produces the signal SM successively as shown in FIG. 10A.

The signal SM is supplied through a playback amplifier 43 to a bandpass filter 44 which then produces the FM luminance signal SF. The signal SF is supplied through a limiter 45 to an FM demodulating circuit 46, in which it is demodulated to provide the luminance signal SY. The luminance signal SY is supplied to the adding circuit 47.

The signal SM from the playback amplifier 43 is supplied to a bandpass filter 51 from which the carrier chrominance signal SC is derived. The carrier chrominance signal SC is supplied to a frequency converter 52, in which it is converted into the carrier chrominance signal SC having the original carrier frequency and phase. The signal SC is supplied to a C-comb filter 53, in which a crosstalk component between adjacent tracks is removed from the signal SC and the thus processed signal is supplied to the adding circuit 47.

Therefore, the original NTSC color composite video signal is produced from the adding circuit 47 and then fed to a terminal 48.

The signal SM from the playback amplifier 43 is supplied to a bandpass filter 61M which then derives the FM signal SM. The signal SM is supplied through a limiter 62M to an FM demodulating circuit 63M, in which it is demodulated to provide a sum signal (L+R). The sum signal (L+R) is supplied to a matrix circuit 64.

Further, the signal SM from the playback amplifier 43 is supplied to a bandpass filter 61S which then derives the FM signal SS. This FM signal SS is supplied through a limiter 62S to an FM demodulating circuit 63S in which it is demodulated to provide the difference signal (L−R). The difference signal (L−R) is supplied to the matrix circuit 64.

Thus, the matrix circuit 64 derives the left and right channel audio signals L and R and these signals L and R are fed to terminals 65L, 65R, respectively.

The signal SA from the head amplifiers 41A, 41B is supplied to a switching circuit 71 and the control signal is supplied from the generating circuit 3 to the switching circuit 71 so that the switching circuit 71 derives the signal SA at every field. The signal SA is supplied through a playback amplifier 72 to a bandpass filter 73 from which the signal SX or SN is derived.

If the bandpass filter 73 derives the signal SX, then this signal SX is supplied to a demodulating circuit 74, in which it is demodulated to provide the digital data DX. The digital data DX is supplied to a playback processor circuit 75X, in which it is error-corrected and timebase-expanded to provide the original digital audio data. This original digital audio data is fed to a switching circuit 76.

If the bandpass filter 73 derives the signal SN, then the signal SN is supplied to a demodulating circuit 74N, in which it is demodulated to provide the digital data DN. The digital data DN is supplied to a playback processor circuit 75N, in which it is error-corrected and timebase-expanded to provide the original digital audio data. This original digital audio data is supplied to the switching circuit 76.

In that event, the enable signals EX, EN are supplied from the generating circuit 6 to the demodulating circuits 74X, 74N and the playback processor circuits 75X, 75N.

Further, signals indicating error rate are supplied from the playback processor circuits 75X, 75N to the system controller 3 which then determines on the basis of the magnitude of error rate whether the signal from the bandpass filter 73 is the signal SX or SN. The switching circuit 76 is changed in position in accordance with the judged result. As described above, the switching circuit 76 derives the digital audio data of the processor circuit 75X when the bandpass filter 73 derives the signal SX and the digital audio data of the processor circuit 75N when the bandpass filter 73 derives the signal SN.

Then, the digital audio data from the switching circuit 76 is supplied to a digital-to-analog (D/A) converter 77 and the control signal is supplied from the system controller 3 to the D/A converter 77, whereby the clock frequency of the D/A converter 77 is switched in response to the PCM audio signal recording modes as shown in FIG. 2. Therefore, the D/A converter 77 derives the original left and right channel audio signals and these audio signals are respectively supplied to terminals 78L, 78R.

In the above playback mode, the kind of tape cassette, the PCM audio signal reproducing mode and so on are displayed on the display 7 by the output of the system controller 3.

The video and audio signals are recorded and reproduced as described above. Particularly in accordance with the present invention, when the PCM audio signal is recorded, the magnitude of the recording current fed to the rotary heads 1A, 1B is controlled so as to fall in an optimum value according to the kind of tape cassette and the recording format of the PCM audio signal, that is, the MP tape cassette, the HGMP tape cassette, the ME tape cassette and the NRML mode, the L mode and the N mode as shown in FIG. 6 so that, upon reproduction, the error rate of the reproduced PCM audio signal can be minimized.

Further, since the tape sensor 4 determines the tape cassette from the MP tape cassette, the HGMP tape cassette and the ME tape cassette so that the recording current is automatically controlled so as to become optimum, the user need not remember the kinds of the tape cassettes.

As described above, in the 8-mm video tape recorder, the MP tape cassette, the HGMP tape cassette and the ME tape cassette are available as the tape cassette; the standard mode and the high band mode are available as the recording mode of the video signal; and the NRML mode, the L mode and the N mode are available as the PCM audio signal recording mode.

Further, if the mode is divided from a recording time standpoint, then a standard time mode and a long time mode are available. The standard time mode and long time mode will hereinafter referred to as "SP mode" and "LP mode", respectively.

Therefore, in use, the user must select the mode correctly, otherwise the correct recording cannot be performed due to the wrong combination of modes.

In accordance with the following second embodiment of the present invention, the optimum modes can be automatically selected in accordance with the type of the tape cassette. The hardware of the second embodiment is the same as that of the first embodiment shown in FIGS. 7 and 8 and the hardware of the first embodiment is used for the second embodiment.

As shown in FIGS. 7A, 7B, the tape sensor 4 determines by checking the ID hole of the tape cassette whether the tape cassette is the MP tape cassette, the HGMP tape cassette or the ME tape cassette. Then, the detected signal from the tape sensor 4 is supplied to the system controller 3.

Figures 12, 13:
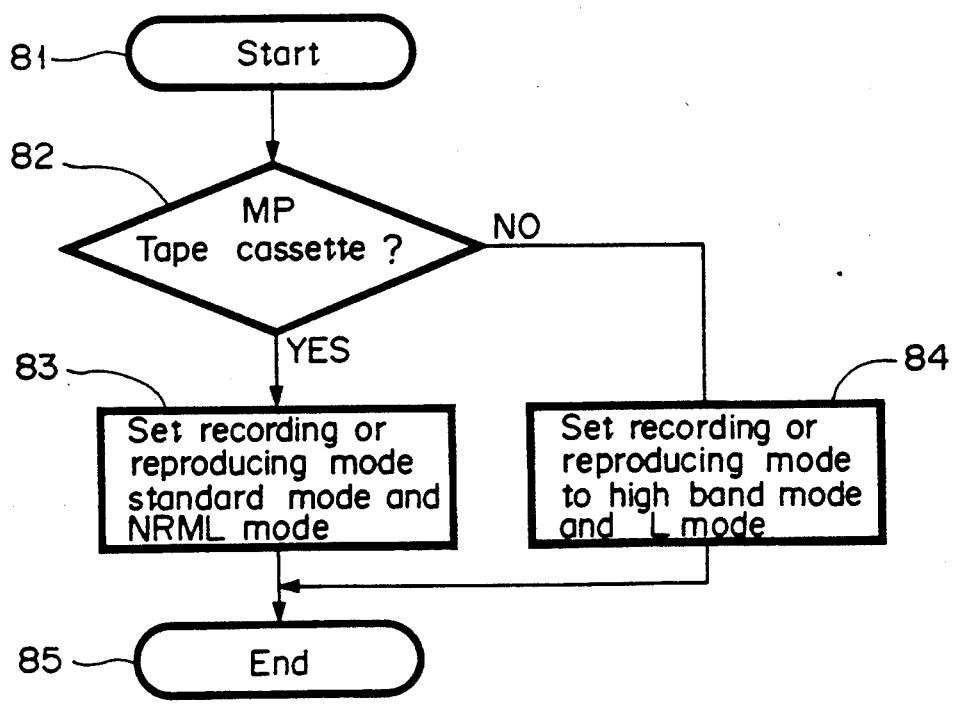
FIG. 12 is a table used to explain a second embodiment of the present invention.
FIG. 13 is a flowchart to which references will be made in explaining operation of the second embodiment of the present invention.

On the basis of the detected signal from the tape sensor 4, the system controller 3 selects the enable signals EX, EN and the luminance signal recording modes and the PCM audio signal recording modes as shown in FIG. 12.

That is, the modulation characteristic of the FM modulating circuit 13, the sampling frequency of the A/D converter 31 and the switching circuit 34 are controlled by the system controller 3 so that, when the tape cassette is the MP tape cassette, the luminance signal SY is recorded in the standard mode regardless of the recording time mode and the PCM audio signal is recorded in the NRML mode or so that, when the tape cassette is the HGMP tape cassette or the ME tape cassette, the luminance signal SY is recorded in the high band mode regardless of the recording time mode and the audio signal is recorded in the L mode (sampling frequency is 48 kHz). At that time, the magnitude of the recording current fed to the rotary heads 1A, 1B is controlled so as to become the optimum value.

Upon reproduction, on the basis of the detected signal from the tape sensor 4, the system controller 3 selects the enable signals EX, EN and the luminance signal reproducing modes and the PCM audio signal reproducing modes as shown in FIG. 12.

Therefore, according to the video tape recorder of the second embodiment, the recording is performed in the correct mode in accordance with the kind of the tape cassette so that the user need not select the mode. In addition, the recording is performed in highest quality of image and highest quality of sound that can be realized by the tape cassette.

A routine 80 of FIG. 13 illustrates an example of routine in which the system controller 3 selects the recording mode or the reproducing mode in accordance with the kind of the tape cassette.

Referring to FIG. 13, the routine 80 begins with step 81 and the processing proceeds to the next decision step 82. It is determined in decision step 82 on the basis of the detected output from the tape sensor 4 whether the tape cassette is the MP tape cassette. If the tape cassette is the MP tape cassette as represented by a YES at decision step 82, then the processing proceeds from step 82 to step 83. In step 83, the recording mode or the reproducing mode is set to the standard mode and the NMRL mode and, the routine 80 ends with step 85.

If the tape cassette is not the MP tape cassette as represented by a NO at decision step 82, then the processing proceeds from step 82 to step 84. In step 84, the recording mode or the reproducing mode is set to the high band mode and the L mode and, the routine 80 ends with step 85.

Figures 14, 15:
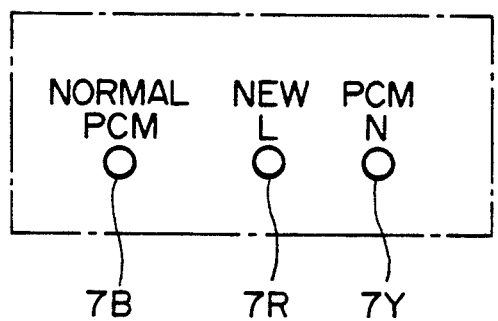
FIG. 14 is a plan view of an operation panel of the video tape recorder and to which references will be made in explaining a third embodiment of the present invention.
FIG. 15 is a table showing displayed conditions on the display panel and to which references will be made in explaining operation of the third embodiment of the present invention.

A third embodiment of the video tape recorder according to the present invention will be described with reference to FIGS. 14 and 15. FIG. 14 shows an example of the operation panel of the video tape recorder in which possible combinations of the tape cassettes and the modes are displayed under the condition that the user is allowed to select the combination of the tape cassette and the mode.

As shown in FIG. 14, a blue LED 7B, a red LED 7R and a yellow LED 7Y are mounted on the operation panel of the video tape recorder as the display 7. Also, as shown in FIG. 15, the standard mode and the NRML mode are paired, the high band mode and the L mode are paired and the high band mode and the N mode are paired, respectively.

When the tape cassette is loaded onto the video tape recorder, the type of the tape cassette is identified by the tape sensor 4 and the LEDs 7B, 7R and 7Y are turned on in accordance with the type of the tape cassette as shown in FIG. 15. For example, if the tape cassette is the MP tape cassette, then only the LED 7B is turned on, and if the tape cassette is the ME tape cassette, then the LEDs 7B, 7R and 7Y are all turned on.

When a recording mode key is operated, then the mode of the highest quality of image and tone is selected from the modes that can be selected by the tape cassette loaded onto the video tape recorder by the system controller 3 and displayed on the LEDs 7B, 7R and 7Y. Then, the recording is made in the selected mode. If the tape cassette is, for example, the ME tape, then the LED 7R is turned on and the recording is made in the high band mode and the L mode (sampling frequency is 48 kHz).

Alternatively, when the tape cassette is loaded onto the video tape recorder, the type of the tape cassette is identified by the tape sensor 4 and the mode of highest quality of image and tone is selected from the modes that can be recorded by the tape cassette loaded onto the video tape recorder in accordance with the kind of the tape cassette. Then, the corresponding LED in the LEDs 7B to 7Y is turned on and the recording is started in the selected mode by operating the recording key. For example, if the tape cassette is the ME tape cassette, then the LED 7R is turned on and the recording is carried out in the high band mode and the L mode by operating the recording key.

Therefore, according to this video tape recorder, the recording can be performed in the correct mode in accordance with the kind of the tape cassette.

According to the present invention, when the PCM audio signal is recorded, the magnitude of the recording current fed to the rotary heads 1A, 1B is controlled so as to fall in an optimum value according to the kind of tape cassette and the recording format of the PCM audio signal, that is, the MP tape cassette, the HGMP tape cassette, the ME tape cassette and the NRML mode, the L mode and the N mode as shown in FIG. 6 so that, upon reproduction, the error rate of the reproduced PCM audio signal can be minimized.

Further, since the tape sensor 4 determines the tape cassette from the MP tape cassette, the HGMP tape cassette and the ME tape cassette such that the recording current is automatically controlled so as to become optimum, the user need not remember the kinds of the tape cassettes.

Having described the preferred embodiments of the invention with reference to the accompanying drawings, it is to be understood that the invention is not limited to those precise embodiments and that various changes and modifications thereof could be effected by one skilled in the art without departing from the spirit or scope of the invention as defined in the appended claims.

What is claimed is:

1. An apparatus for selectively recording a digital information signal representing picture and sound information on a first magnetic tape cassette having a tape with an optimum recording current that decreases with increasing recording frequency or a second magnetic tape cassette having a tape with an optimum recording current that increases with increasing recording frequency, said digital information signal selectively having a recording mode of a first standard or a recording mode of a second standard, said apparatus comprising:

first sensor means for detecting the kind of said magnetic tape cassette and producing an output in accordance therewith;

second sensor means for detecting the kind of said recording mode and producing an output in accordance therewith; and control means responsive to the outputs of said first sensor means and said second sensor means for controlling a value of recording current for said digital information signal to optimize the recording current of said picture and sound information.

2. An apparatus according to claim 1 wherein said digital information signal includes an audio PCM signal.

3. An apparatus according to claim 2 further comprising recording means for recording said digital information signal on said first magnetic tape cassette or said second magnetic tape cassette.

4. An apparatus according to claim 3 wherein the tape of said first magnetic tape cassette is a metal particle tape and the tape of said second magnetic cassette is a metal evaporated tape.

5. An apparatus according to claim 4 wherein said first standard is a linear mode and said second standard is a non-linear mode.

6. An apparatus according to claim 3 wherein said recording means has a normal recording mode and a high-band mode.

7. An apparatus according to claim 1 wherein said control means comprises a microcomputer.

8. An apparatus according to claim 3 wherein said recording means comprises an 8-mm video tape recorder.

* * * * *